(12) United States Patent
Katar et al.

(10) Patent No.: US 8,886,203 B2
(45) Date of Patent: Nov. 11, 2014

(54) DYNAMIC CHANNEL REUSE IN MULTI-ACCESS COMMUNICATION SYSTEMS

(75) Inventors: Srinivas Katar, Gainesville, FL (US); Hao Zhu, Ocala, FL (US); Lawrence Winston Yonge, III, Summerfield, FL (US); Manjunath Anandarama Krishnam, Gainesville, FL (US); Stanley J. Kostoff, II, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 13/338,384

(22) Filed: Dec. 28, 2011

(65) Prior Publication Data

US 2013/0171999 A1  Jul. 4, 2013

(51) Int. Cl.
*H04W 72/00* (2009.01)

(52) U.S. Cl.
USPC ........... 455/447; 455/434; 455/501; 370/338; 370/350

(58) Field of Classification Search
CPC ...... H04W 16/02; H04W 16/12; H04W 24/10
USPC ............. 455/450, 447, 452.2, 62, 436, 562.1, 455/501, 434, 67.11, 63.1; 370/332, 337, 370/350, 328, 338, 252; 375/285
See application file for complete search history.

(56) References Cited

U.S. PATENT DOCUMENTS

| | | | |
|---|---|---|---|
| 4,025,853 A | 5/1977 | Addeo | |
| 4,670,906 A | 6/1987 | Thro | |
| 4,809,257 A | 2/1989 | Gantenbein et al. | |
| 5,003,619 A | 3/1991 | Morris et al. | |
| 5,303,234 A * | 4/1994 | Kou | 370/442 |
| 5,566,165 A | 10/1996 | Sawahashi et al. | |
| 5,623,486 A | 4/1997 | Dohi et al. | |
| 5,625,627 A | 4/1997 | Ishi | |
| 5,768,684 A | 6/1998 | Grubb et al. | |
| 5,787,352 A | 7/1998 | Benveniste | |
| 5,898,927 A | 4/1999 | Ishii et al. | |
| 5,987,333 A | 11/1999 | Sole | |
| 6,131,031 A * | 10/2000 | Lober et al. | 455/444 |
| 6,157,616 A | 12/2000 | Whitehead | |
| 6,163,696 A | 12/2000 | Bi et al. | |
| 6,493,331 B1 * | 12/2002 | Walton et al. | 370/341 |
| 6,497,599 B1 | 12/2002 | Johnson et al. | |

(Continued)

FOREIGN PATENT DOCUMENTS

WO      2005119478 A1    12/2005

OTHER PUBLICATIONS

Kim, Tae-Suk et al., "Improving Spatial Reuse through Tuning Transmit Power, Carrier Sense Threshold, and Data Rate in Multi-hop Wireless Networks," Power point presentation—University of Illinois at Urbana-Champaign, ACM MobiCom 2006, 24 pages.

(Continued)

*Primary Examiner* — Mahendra Patel

(74) *Attorney, Agent, or Firm* — DeLizio Gilliam, PLLC

(57) ABSTRACT

Dynamic channel reuse in multi-access communication systems. A first station in a communication network may receive a transmission over a communication medium. The first station may generate a reuse determination based on information from the received transmission. The reuse determination may be usable with at least one other reuse determination to coordinate reuse of the communication medium.

24 Claims, 7 Drawing Sheets

(56) References Cited

U.S. PATENT DOCUMENTS

| | | | |
|---|---|---|---|
| 6,546,254 B2 | 4/2003 | Fitzgerald | |
| 6,643,272 B1 | 11/2003 | Moon et al. | |
| 6,985,456 B2 | 1/2006 | Gaskill et al. | |
| 7,076,274 B2 | 7/2006 | Jollota et al. | |
| 7,177,298 B2 | 2/2007 | Chillariga et al. | |
| 7,200,374 B1 | 4/2007 | Stephens | |
| 7,209,467 B2 | 4/2007 | Liu et al. | |
| 7,286,474 B2 | 10/2007 | Garg et al. | |
| 7,423,991 B2* | 9/2008 | Cho et al. | 370/329 |
| 7,639,726 B1 | 12/2009 | Sinsuan et al. | |
| 7,760,698 B2* | 7/2010 | Chen et al. | 370/342 |
| 7,881,245 B2* | 2/2011 | Vijayan et al. | 370/312 |
| 8,032,145 B2* | 10/2011 | Ji | 455/450 |
| 8,059,589 B2* | 11/2011 | Ji et al. | 370/329 |
| 8,131,228 B2* | 3/2012 | Liao et al. | 455/101 |
| 8,400,908 B2* | 3/2013 | Chun et al. | 370/210 |
| 8,451,866 B2* | 5/2013 | Kim et al. | 370/476 |
| 8,498,579 B2 | 7/2013 | Yonge, III et al. | |
| 8,503,480 B2* | 8/2013 | Yonge et al. | 370/468 |
| 8,565,161 B2* | 10/2013 | Pajukoski et al. | 370/329 |
| 2001/0006517 A1* | 7/2001 | Lin et al. | 370/348 |
| 2002/0010870 A1 | 1/2002 | Gardner | |
| 2002/0065094 A1 | 5/2002 | Schmutz et al. | |
| 2002/0105925 A1 | 8/2002 | Shoemake | |
| 2002/0123357 A1 | 9/2002 | Abrishamkar et al. | |
| 2003/0050067 A1* | 3/2003 | Rozmaryn | 455/447 |
| 2003/0123400 A1* | 7/2003 | Kloos et al. | 370/317 |
| 2003/0174690 A1* | 9/2003 | Benveniste | 370/350 |
| 2003/0184433 A1 | 10/2003 | Zalitzky et al. | |
| 2003/0193907 A1 | 10/2003 | Rezaiifar et al. | |
| 2003/0199283 A1 | 10/2003 | Busch | |
| 2004/0203857 A1* | 10/2004 | Wang | 455/456.1 |
| 2005/0169222 A1* | 8/2005 | Ayyagari et al. | 370/338 |
| 2005/0220230 A1 | 10/2005 | Fukuda | |
| 2006/0221999 A1 | 10/2006 | Bachrach et al. | |
| 2006/0262721 A1 | 11/2006 | Radunovic et al. | |
| 2007/0222578 A1 | 9/2007 | Iwamura | |
| 2008/0214182 A1 | 9/2008 | Wang et al. | |
| 2009/0003306 A1* | 1/2009 | Plutov et al. | 370/348 |
| 2009/0074007 A1* | 3/2009 | Yonge et al. | 370/468 |
| 2009/0081955 A1* | 3/2009 | Necker | 455/63.1 |
| 2009/0082054 A1* | 3/2009 | Li et al. | 455/522 |
| 2009/0116461 A1 | 5/2009 | Yonge, III et al. | |
| 2009/0137241 A1* | 5/2009 | Yavuz et al. | 455/423 |
| 2009/0225714 A1* | 9/2009 | Kim et al. | 370/329 |
| 2010/0075704 A1 | 3/2010 | McHenry et al. | |
| 2010/0105406 A1* | 4/2010 | Luo et al. | 455/452.2 |
| 2011/0003598 A1* | 1/2011 | Ma et al. | 455/452.1 |
| 2011/0013531 A1* | 1/2011 | Liu | 370/252 |
| 2011/0014910 A1 | 1/2011 | Yonge et al. | |
| 2011/0034166 A1 | 2/2011 | Karabinis et al. | |
| 2011/0092209 A1* | 4/2011 | Gaal et al. | 455/436 |
| 2011/0103367 A1 | 5/2011 | Ishii | |
| 2011/0164514 A1 | 7/2011 | Afkhamie et al. | |
| 2011/0167291 A1 | 7/2011 | Liu et al. | |
| 2012/0028584 A1* | 2/2012 | Zhang et al. | 455/63.1 |
| 2012/0028664 A1* | 2/2012 | Zhang et al. | 455/501 |
| 2012/0329460 A1* | 12/2012 | Huang et al. | 455/436 |
| 2013/0235737 A1* | 9/2013 | Merlin et al. | 370/252 |
| 2013/0279621 A1 | 10/2013 | Yonge, III et al. | |

OTHER PUBLICATIONS

Yang, Xue et al., "On the Physical Carrier Sense in Wireless Ad Hoc Networks," Technical Report, Jul. 2004, University of Illinois at Urbana-Champaign, pp. 1-13.
U.S. Appl. No. 12/505,773 Final Office Action, Apr. 24, 2012, 21 pages.
U.S. Appl. No. 12/505,773 Non-Final Office Action, Dec. 6, 2012, 21 Pages.
U.S. Appl. No. 12/505,773 Office Action, Sep. 29, 2011, 17 pages.
U.S. Appl. No. 12/505,773 Office Action, Feb. 7, 2012, 19 pages.
International Search Report and Written Opinion—PCT/US2012/071852—ISA/EPO—Mar. 25, 2013.
PCT Application No. PCT/US2012/071852 Written Opinion of the IPEA, Mar. 6, 2014, 10 pages.
U.S. Appl. No. 13/923,153 Final Office Action, Mar. 21, 2014, 7 pages.
U.S. Appl. No. 13/923,153 Office Action, Dec. 4, 2013, 6 pages.
"PCT Application No. PCT/US2012/071852 International Preliminary Report on Patentability", May 23, 2014, 10 pages.

* cited by examiner

DYNAMIC CHANNEL REUSE IN MULTI-ACCESS COMMUNICATION SYSTEMS

BACKGROUND

1. Field of the Disclosure

The present disclosure relates generally to communication systems, and more particularly to channel reuse in communication systems.

2. Description of the Related Art

In many widely used communication media, such as satellite systems, wireless systems, powerline, coaxial cable, and telephone line, a signal received by a station might be the sum of attenuated transmitted signals from a set of other stations, corrupted by distortion, delay, and noise. Such media, called multi-access media, are the basis for local area networks (LANs), metropolitan area networks (MANs), satellite networks, and cellular networks. In such communication systems, signals from stations other than the desired transmitter station are considered as interference at the receiver station. According to modern communication theory, a signal can be successfully received if the signal-to-interference-plus-noise ratio (SINR) at the receiver station is greater than a threshold. This gives the opportunity to improve the capacity of multi-access communication systems by allowing a set of stations that do not cause strong interference to each other, to reuse the same channel. The approach is called channel reuse.

The strength of electromagnetic signals attenuates along their propagation over various types of communication media. At a receiver station, when the interference signal strength is small enough such that the SINR at the station is sufficiently high, both the transmitter station and interfering station may transmit data over the same channel simultaneously. To support channel reuse, cellular systems can use a channel allocation mechanism to allow spatially apart stations to use the same channel at the same time. Typically, the cellular system is geographically divided into cells, each covered by a central controller, known as a base station. The set of available channels is partitioned into subsets called reuse groups. These channel groups may then be assigned to the cells in such a way that cells with the same group of channels are not close together. How close the co-channel cells are with each other may depend on the SINR requirement.

Although such a channel reuse mechanism may work well in cellular systems, it may require the service provider to perform the centralized channel planning. Such a requirement may be difficult to meet in many ad hoc multi-access communication systems, such as home networks that are deployed and managed by individual customers, and use wireless powerline, coaxial cable, and/or phone lines as the communication media. For example, a large number of home units may exist in an area. Due to the lack of a central entity performing channel planning, the corresponding channel allocation problem may be highly complex to solve with the same channel planning mechanism used in cellular systems. In addition, as the usage of each network could be highly dynamic, static (or pre-specified) channel allocation could significantly affect spectrum efficiency due to the waste (e.g., under usage) of some channels.

SUMMARY OF THE DISCLOSURE

Techniques are disclosed for dynamic channel reuse in multi-access communication systems. A first station in a communication network may receive a transmission over a communication medium. The first station may generate a reuse determination based on the received transmission. The reuse determination may be usable with at least one other reuse determination to coordinate reuse of the communication medium.

BRIEF DESCRIPTION OF THE DRAWINGS

A better understanding of the present disclosure can be obtained when the following Detailed Description of the Embodiments is read in conjunction with the following drawings, in which.

Figure 1:
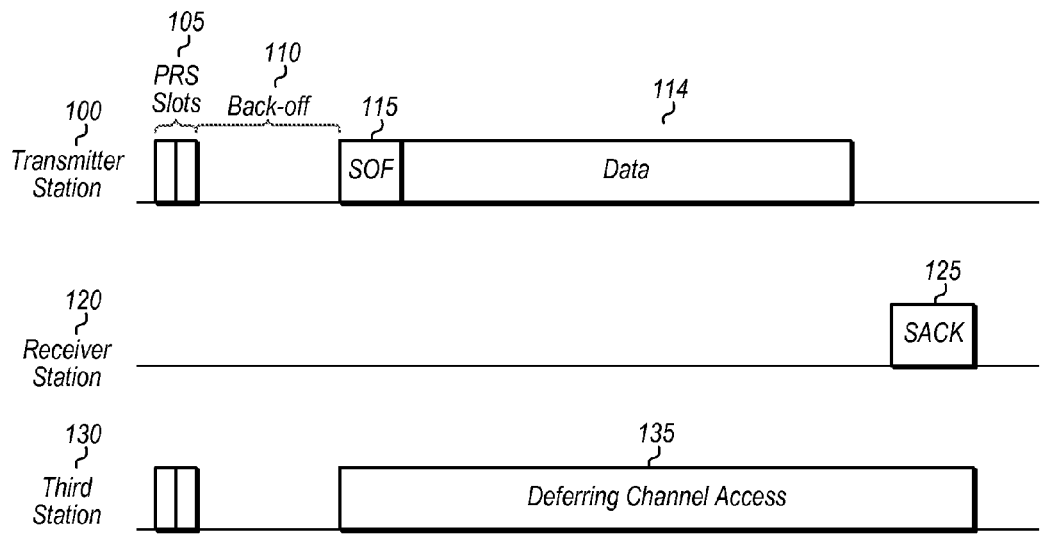
FIG. 1 illustrates behavior of stations in a typical CSMA network.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS OF THE DISCLOSURE

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Storage Medium—a storage medium (or memory medium) may include any non-transitory/tangible storage media readable by a computer/processor. For example, the media may be read to provide instructions and/or data to the computer/processor. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Comprising—this term is open-ended. As used in the appended claims, this term does not foreclose additional structure or steps. Consider a claim that recites: "An apparatus comprising a station . . . ." Such a claim does not foreclose the apparatus from including additional components (e.g., a receiver, a processor, a storage medium, an antenna, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a network of stations, the terms "first" and "second" stations can be used to refer to any two stations. In other words, the "first" and "second" stations are not limited to logical stations 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

Transmission Medium—Any of various media capable of being used for transmitting/receiving communication, including wired transmission media (such as twisted pair, optical fiber, telephone wiring, electrical wiring, etc) or wireless transmission media (such as any of a variety of licensed or unlicensed bands in the electromagnetic spectrum, etc.). The phrase "dynamic transmission medium" may more specifically refer to a transmission medium which is subject to substantial changes in its PHY rate over time. 802.11 (WLAN/Wi-Fi) and powerline communication networks (PLC) are two examples of networking technologies which utilize dynamic transmission media: relatively unpredictable factors such as interference, channel fading, noisy conditions, and others may affect both the ISM bands used by 802.11 networks and the electrical wiring used by PLC networks.

Embodiments relate to dynamic channel reuse in multi-access communication networks. Although some embodiments are described in terms of powerline devices in a powerline network for ease of understanding, the disclosed embodiments may apply equally to other network devices, networks (including hybrid networks, e.g., powerline and coaxial home network), and technologies. Due to the low implementation cost and satisfactory performance, the carrier sense multiple access (CSMA) protocol has been adopted by the medium access control (MAC) protocols used in various multi-access communication systems (e.g., wireless/powerline LANs). In CSMA, a station may determine if the channel is being used by other stations in the network before the station transmits its data packet by sensing the communication medium. If the channel is currently occupied, the station defers its transmission until the channel becomes available. Otherwise, the station may access the channel with a certain probability which, in practice, is implemented by backing off the transmission for a short time period, where the back-off period length depends on the channel access probability.

In powerline communication networks the communication medium is a powerline that is also used for electric power transmission. For example, powerline communication networks use existing electrical wiring and outlets in a home or small business to connect PCs, broadband modems, set-top boxes, gaming consoles, audio/video players, flat screen displays, security cameras and other electronics devices.

In some examples, powerline communication networks can be patterned on a layered communication network model, such as, the seven-layer open systems interconnection (OSI) network model adopted by International Telecommunication Union (ITU) as a standard. The seven layers include a physical layer (PHY), data link layer, network layer, transport layer, session layer, presentation layer, and application layer. The PHY is fundamental layer that concerns the physical implementation of the communication network. The physical layer interfaces with the data link layer to encapsulate communication data for transmission over the powerline medium. The data link layer includes a media access control (MAC) sublayer for providing addressing and channel access control mechanisms to enable communication between the various stations in the powerline communication network. The PHY organizes communication data from the higher levels into bit stream data units known as PHY protocol data units (PPDU) for transmission over the powerline medium.

FIG. 1 illustrates behavior of stations in a typical powerline communication (PLC) network. Similar to the MAC protocol used in wireless local area networks (e.g., IEEE 802.11 WLANs), the MAC protocol commonly used in powerline communication (PLC) networks belongs to the CSMA family of protocols. When a transmitter station 100 has a data packet to transmit and the channel is not occupied, transmitter station 100 may send its priority symbols in the two priority resolution (PRS) slots 105. The priority symbols may indicate the transmission priority of the station's pending data packet. For another station with lower transmission priority than transmitter station 100, that other station may yield the channel to the station having higher priority (e.g., transmitter station 100). After sending its priority symbols in the two PRS slots, if the transmitter station 100 does not lose the channel contention due to priority, transmitter station 100 may initiate random back-off procedure 110 by randomly selecting a number of contention slots from a specified range. If the channel is still free after the back-off procedure 110 ends, transmitter station 100 may start to transmit its data packet 114. The data packet 114 may be encapsulated by a MAC layer header called start of frame (SOF) delimiter 115, in which some control information (e.g., data packet transmission time) is piggybacked in the reserved delimiter fields. If the receiver station 120 successfully receives the data packet 114, it may acknowledge receipt with, for example, a small selective acknowledgement (SAK) packet 125. Meanwhile, based on the transmission time information in the SOF delimiter, a third station 130 may start medium/channel access deferral 135 and resume contention for the channel when the current transmission completes. Note that reference to a receiver station and a transmitter station may simply be used to describe that the respective station is configured to receive or transmit a signal. In various embodiments, stations may be configured to both receive and transmit, either at different times or at the same time. Thus, use of the term receiver station does not imply that the station is not capable of transmitting. Similarly, use of the term transmitter station does not imply that the station is not capable of receiving.

Figure 2:
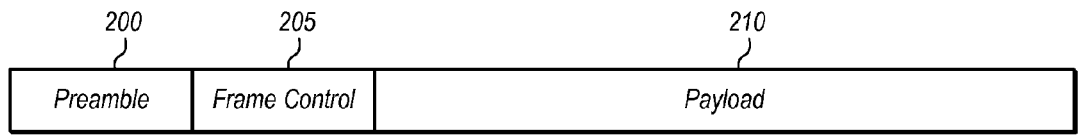
FIG. 2 illustrates an example PHY protocol data unit (PPDU) format.

For each data packet from the MAC layer, the PHY layer may organize the packet into bit stream data units known as PHY protocol data units (PPDU) for transmission over the transmission medium (e.g., powerline medium). Turning now to FIG. 2, an example format of a PPDU may include a preamble 200, a frame control portion 205, and a payload 210. Preamble 200 and frame control 205 may be collectively referred to as a delimiter. The preamble 200 could be a predetermined pattern that may be used by a receiver station to determine the start of the PPDU. The preamble 200 may also be used for carrier sensing. In some instances, a receiver station may perform symbol correlation tests for preamble detection. A degree of correlation obtained from the tests can be used to determine whether a preamble pattern is detected in the received signal. The frame control 205 portion of a PPDU may include MAC and PHY related control information, such as the source and destination address of the PPDU, the network identity to which the transmitter station of the PPDU belongs, information necessary to demodulate the PPDU payload (e.g., modulation and coding information), information regarding the transmission time/length of the payload, and other channel access information. The payload 210 may include application data or management messages. In some examples, the PPDU may not include payload 210. Note that reference to a receiver station and a transmitter station may simply be used to describe that the respective station is configured to receive or transmit a signal. In various embodiments, stations may be configured to both receive and transmit, either at different times or at the same time. Thus, use of the term receiver station does not imply that the station is not capable of transmitting. Similarly, use of the term transmitter station does not imply that the station is not capable of receiving.

Signals transmitted over a transmission powerline medium may be contaminated by various noises or interference. For this reason, a delimiter may use robust modulation and encoding schemes to minimize the impact of potential noises and interference in, for example, the powerline medium. Therefore, robust carrier sensing and frame control functionality can be provided to powerline systems. Since the robustness is at the cost of low transmission data rate, for payload transmissions, an adaptive rate may be used to balance transmission reliability and transmission data rate. Therefore, a preamble and frame control may use different modulation and coding schemes than used for transmitting the payload. Different modulation and coding schemes of delimiters and payloads may result in different ranges in which delimiters and payloads will be successfully received by a station with a high probability, respectively.

Figure 3:
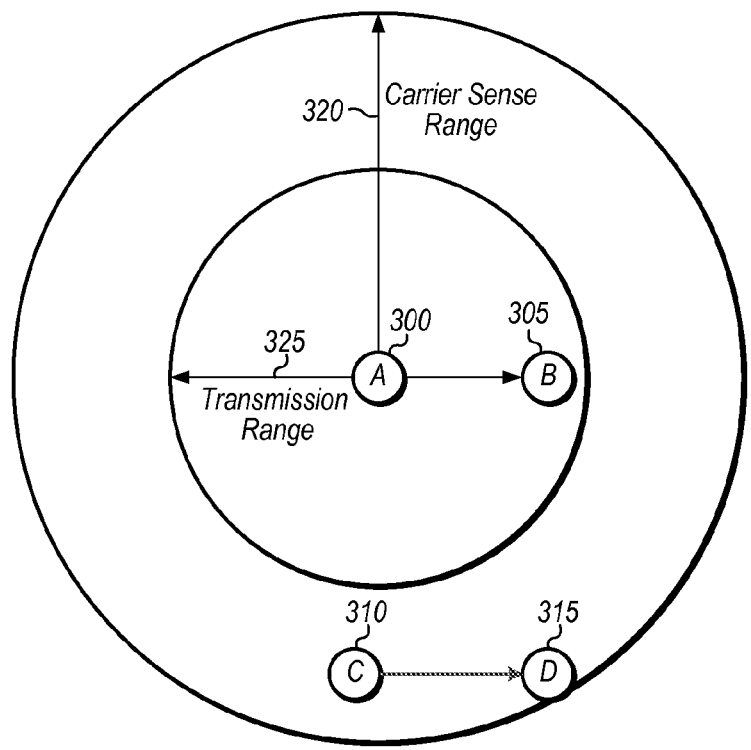
FIG. 3 illustrates an example carrier sense range and an example transmission range, according to one embodiment.

Turning now to FIG. 3, an example carrier sense range and an example transmission range for a station is illustrated. Specifically, given the fixed modulation and coding schemes, the two ranges, carrier sense and transmission, are shown for receiver station 300 in the illustrated embodiment. Delimiters transmitted within the carrier sensing range 320 may be decoded by the receiver station 300 with a high probability. However, since payloads may use a less robust modulation and coding scheme, payloads transmitted within transmission range 325 may be received by receiver station 300 with a high probability. Accordingly, payloads transmitted within the portion of carrier sense range 320 that does not overlap with transmission range 325 may not be received by receiver station 300 with high probability. Note that the transmission range may depend on the modulation and coding scheme used for payloads. In some situations, the transmission range 325 may be the same as the carrier sense range 320 if the payloads use the same modulation and coding scheme as delimiters. In other embodiments, if payloads use a more efficient modulation and coding scheme than delimiters, the transmission range 325 may be much smaller than the carrier sense range 320.

In some examples, if one station is in the carrier sense range of the other station, it does not necessarily mean that the two stations should always share the channel. FIG. 3 illustrates four stations 300, 305, 310, and 315. Stations 300 and 305 may form one network and stations 310 and 315 may form another network. Consider a scenario in which station 300 sends data to station 305 and station 310 sends data to station 315. Assuming all stations have the same carrier sense range and transmission range, FIG. 3 shows that stations 300 and 305 are in the carrier sense range of station 310. Likewise, stations 310 and 315 are in the carrier sense range of station 300. Although station 300 can receive delimiters from station 310, and station 315 from station 305, the signal strength attenuation from station 300 to station 315 may be large enough such that the SINR at station 300 is sufficiently high to receive payloads from station 305 with low bit error rates. Therefore, the channel may be reused for both networks. Similarly, as shown, the signal strength attenuation from station 310 to station 305 may be large enough such that the SINR at station 315 is sufficiently high to receive payloads from station 310 with low bit error rates.

The robust transmission of preamble and frame controls, however, may significantly affect channel reuse, for example, in powerline systems using the standard CSMA protocol. When station 300 receives a delimiter from station 310, following the standard CSMA protocol described in FIG. 1, the station may defer its channel contention until station 310 completes transmitting the payload. As a result, the networks may use the channel exclusively whereas the channel could potentially have been reused by both networks to optimize the system performance.

Figure 4:
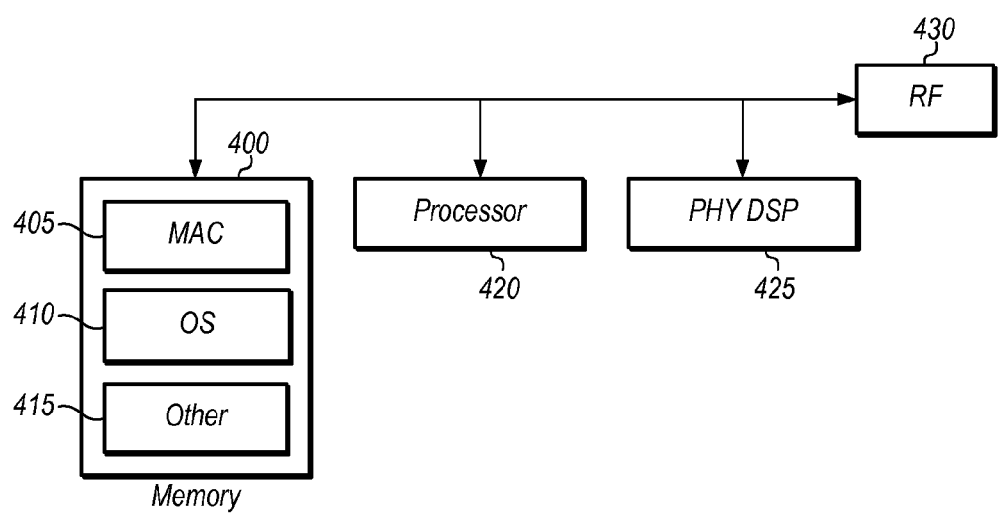
FIG. 4 is an example block diagram of elements of a station, according to some embodiments.

Turning now to FIG. 4, an example block diagram of elements of a station (e.g., powerline communication device) is shown. Although the disclosure is described in the context of powerline communication devices, it may also be extended to other types of multi-access communication systems, such as wireless, coax, or phone line LANs. A powerline communication device may include a PHY digital signal processor (DSP) 425, an RF element 430, a memory 400, and a processor 420. Memory 400 may include a MAC module 405, an operation system module 410, and other supporting modules 415. Processor 420 may be configured to execute instructions stored in the memory 400 to perform various functions of the device, which may include the disclosed dynamic channel reuse techniques. PHY DSP 425 may implement techniques that support the transmission and reception of PPDU with different modulation and coding schemes, thereafter payloads may be transmitted at different data rates. As described herein, PHY DSP 425 may operate under the control of MAC module 405 to transmit a PPDU at a proper time. RF element 430 may transmit and receive baseband signals at various radio frequencies.

Various embodiments of the disclosed techniques may be implemented in MAC module 405. In some embodiments, for each received delimiter, the receiver station may have received and/or determined various pieces of information, for example, the received signal strength, the transmitter station's identity, and the associated network identity. The received signal strength may be obtained from the PHY DSP in a variety of ways. In some implementations, a receiver amplifier has a gain controller to regulate the received signal. The gain may be controlled by automatic gain control (AGC), for example. AGC may enable the receiver station to minimize the quantization noise at the analog-to-digital converter (ADC) by amplifying the signal. Once the appropriate AGC setting for receiving the signal is determined, the station may freeze the gain of the receiver amplifier for the remainder of the PPDU. The locked gain setting of the receiver amplifier for receiving the PPDU may be called AGC gain. Typically, a high AGC gain may indicate a low received signal strength. In other embodiments, other techniques may be used to infer the signal strength of a received signal based on the signal energy of the preamble.

The transmitting station's identity and its network identity information can be extracted from information contained in the received delimiter. Based on the received signal strength and the station and network identities, the receiver station may record the received signal strength into a specific table indexed by station identity and/or network identity. After recording the received signal strength happens, the receiver station can stop measuring the received signal strength for the current PPDU transmission. Alternatively, the station can infer the identities of interest according to the MAC protocol semantics. For example, consider a scenario in which the station receives the delimiter of an acknowledge packet and the delimiter does not have the transmitter station's identity. In such a scenario, the identity information can be inferred from the SOF delimiter, which may include the identity of the target station, of the most recently transmitted data packet since the acknowledge packet is typically transmitted shortly after the receiver station receives the payload.

With the collection of received signal strength information, each station may process the measurements and generate received signal strength statistics for both the local network and neighbor networks to help achieve dynamic channel reuse between neighbor networks. The statistics may be generated on a per station basis or on a per network basis, depending on a tradeoff between statistical sufficiency and memory overhead. If the available memory size is sufficient, in one embodiment, the statistical information can be summarized for each station that may detect received signals. In another embodiment, the statistical information can be summarized for each neighbor network in a similar manner. In some embodiments, an optimization technique can be used to reduce the memory consumption of received signal strength statistics. For instance, instead of storing the complete probability distribution function, it may be sufficient to keep a portion of the distribution function with a satisfactory confidence level.

Figure 5:
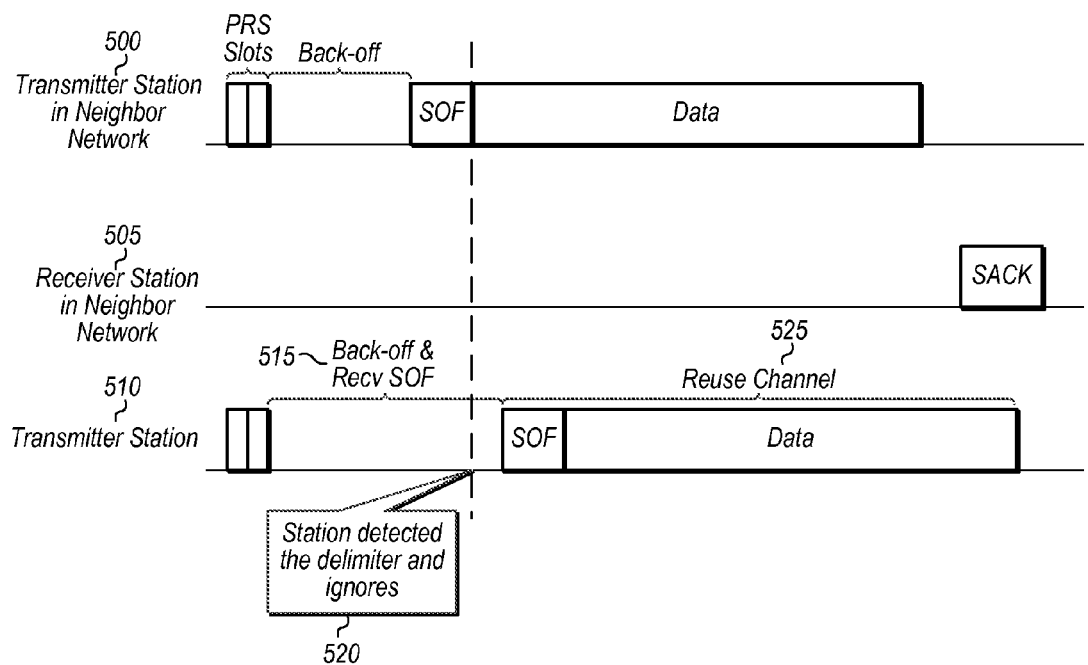
FIG. 5 is a diagram of an example dynamic channel reuse, according to some embodiments.

With the received signal strength statistics, each station may periodically re-evaluate the decisions on whether to reuse the channel with a given neighbor network. Upon detecting a transmission of delimiters from a neighbor network, according to the latest channel reuse decision, each station may continue or defer its channel access, respectively. Referring to FIG. 5, a diagram of an example of executing a channel reuse is shown. Consider an example in which transmitter station 510 decides to reuse the channel with the neighbor network that includes transmitter station 500 and receiver station 505. Because of the robust transmission of delimiters, the SOF delimiter from transmitter station 500 to receiver station 505 can be heard by transmitter station 510. In contrast to the standard CSMA protocol illustrated in FIG. 1, transmitter station 510 may ignore the detected SOF delimiter 520 and resume its back-off procedure 515. When the back-off procedure ends, transmitter station 510 may transmit data to its receiver station. Otherwise, if transmitter station 510 decides to share the channel with the neighbor network, upon detecting the SOF delimiter, transmitter station 510 may defer channel access until the neighbor network's PPDU transmission completes. In some embodiments, each station may maintain a table indexed by the network identity of its neighbor networks. For each neighbor network identity, the corresponding table entry contains a binary variable that indicates the most recent channel reuse decision. In some embodiments, each station may have a list of its active neighbor networks and may make a channel reuse decision for each network on the list one by one.

Figure 6:
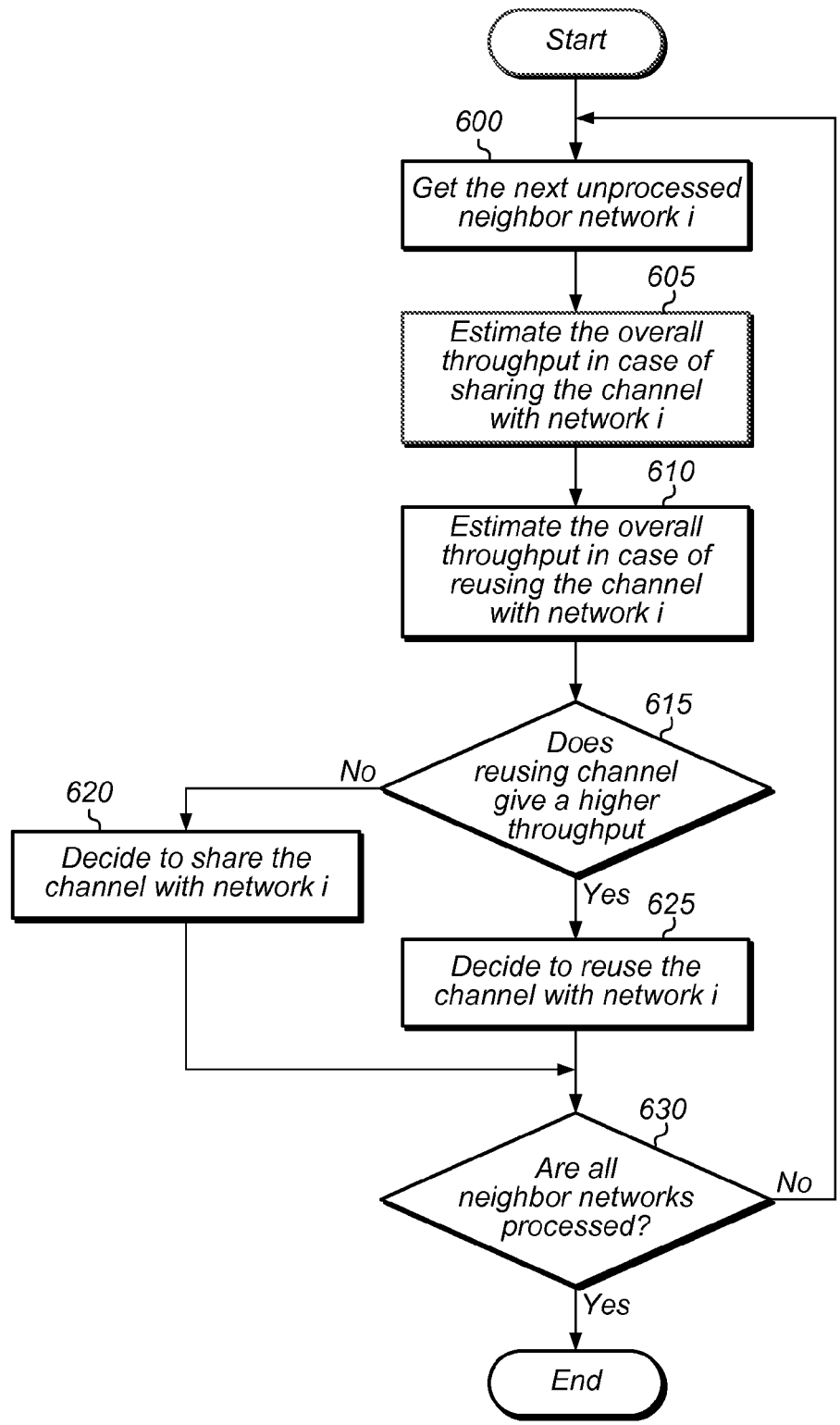
FIG. 6 illustrates a flowchart of one embodiment of a dynamic channel reuse determination.

FIG. 6 illustrates a flowchart of one embodiment of a dynamic channel reuse determination. While the blocks are shown in a particular order for ease of understanding, other orders may be used. In some embodiments, the method of FIG. 6 may include additional (or fewer) blocks than shown.

At 600, a station may initiate the determination process by choosing the next unprocessed neighbor network. In various embodiments, if all of the neighbor networks are unprocessed, the next neighbor network may be a predetermined default neighbor network. In other embodiments, the next unprocessed neighbor network may be the network that is the unprocessed neighbor network that has the strongest received signal strength, where the signal strength may be determined collectively by the network or by the station performing block 600.

As shown at 605, the station may estimate the overall throughput if the station's local network and the target neighbor network were to share the channel with each other. At 610, the overall throughput may be estimated in the situation that the two networks reuse the channel. Criteria used to estimate the overall throughput at 605 and 610 may include several factors. In some embodiments, the transmission data rate and the temporal bandwidth share at the station assuming that it reuses the channel with the neighbor network can be estimated based on the received signal strength statistics of both local network and the neighbor network. Additionally, the transmission data rate and the bandwidth temporal share at the same station, assuming it shares the channel, can be evaluated based on the received signal strength statistics of the local network. In some embodiments, the overall throughput of the local network by sharing or reusing the channel can be quantified by the product of the corresponding transmission data rate and the bandwidth temporal share.

As illustrated at 615, the station may determine if reusing the channel with the target neighbor network would leads to better overall throughput of the station's local network. If not, the station may decide to share the channel with the neighbor network as shown at 620. If reusing the channel with neighbor network will improve the local network throughput, the station may decide to reuse the channel with the neighbor network as shown at 625.

In some embodiments, the channel reuse decision with a neighboring network can take into account the traffic intensity from various stations in that neighbor network. For example, if the strongest interfering station in the neighboring network has very low traffic intensity, the interference from that station may be ignored while making the channel reuse decision. Similarly, in some embodiments, the traffic intensity to and from various stations in the local network can be taken into account while making the channel reuse decision.

At 630, it may be determined if each of the neighbor networks has been processed. The station may repeat blocks 600 to 630 until each neighbor network has been processed. The method of FIG. 6 may be repeated from time to time. For instance, it may be repeated periodically, or upon a change of status in a station or network.

Figure 7:
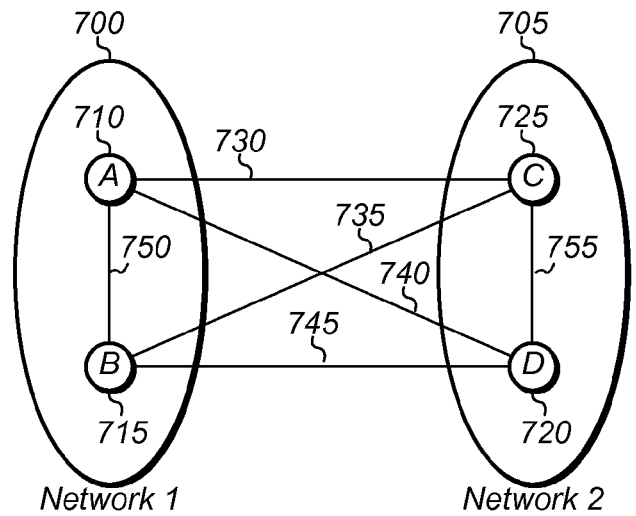
FIGS. 7-9 are example station and network configurations.

For various stations in a local network, each station's channel reuse decision may not be the same. For instance, the transmitted signal may have different signal strength attenuations at different stations in the local network. One example of such a situation is shown in FIG. 7. For ease of understanding, consider a scenario in which signal strength attenuations 730, 750, and 755 are each 30 dB, and signal strength attenuations 735, 740, and 745 are each 60 dB. If networks 700 and 705 were to reuse the channel, the signals from station 725 may cause a low SINR at station 710 whereas the SINR at station 715 may be high enough to support a high data rate. In this example, station 710 may decide to let network 700 share the channel with network 705 but station 715 may decide to let the two networks reuse the channel based on its collected signal strength statistics. Thus, one or more stations in the network may have conflicting network reuse decisions. The conflicting channel reuse decisions may cause stations in the same network to have inconsistent reactions to the detected delimiters from the neighbor.

In some embodiments, local network wide coordination on channel reuse decisions may be used to maintain consistency of channel reuse decisions between various stations in the local network. In some embodiments, a centralized approach may be used in which a single node in the network may make the decision for the entire network. Among the stations in the local network, one station can be selected to be the master station and the remaining stations may be slaves stations. Slave stations may forward their collected received signal strength statistics and other information, such as traffic intensity information, to the master station. Upon obtaining the statistics from each of the slave stations, the master station may determine whether to reuse the channel with each neighborhood network or not. The decision may then be disseminated to the slave stations. In other embodiments, in contrast to letting the master station make the decision alone, a semi-distributed solution may be implemented. For instance, each slave station can make its own decision on whether to reuse the channel with a neighbor network based on its own received signal strength statistics and other information, such as traffic intensity information. The slave stations may then report their respective decisions to the master station. The master station may then combine the report decisions with its own decision and disseminate the combined decision to the slave stations. In yet other embodiments, a fully distributed solution can be provided. For example, each of the stations in a network may make their own decisions based on their own received signal strength statistics and other information, such as traffic intensity information. At a pre-specified time period, each station may disseminate its latest decision to other stations in the network. After gathering the decisions from the other stations in the network, each station may properly combine the decisions with its own decision and follow the combined decision. A combined decision may be a simple majority rules decision or it may weight the various stations' decisions differently (e.g., weighting stations near the network edge greater than other stations, weighting stations near the network edge lesser than other stations, weighting stations decisions based on the underlying received signal strengths of the stations (e.g., weighting a reuse decision of a station that receives transmissions at 30 dB differently than a reuse decision of a station that receives transmissions at 60 dB even though both may make the same decision).

In some embodiments, a specified management message can be used by one station to send the information related to a channel reuse decision to another station. The events of these reporting activities could be made in a reactive way. In some examples, a station may not need to report its decision making related information to other stations at regular time intervals. Instead, the information may be sent to other stations when there is a significant change of information (e.g., received signal strength changes by a certain amount or percentage, change of a reuse/share decision). Taking the semi-distributed decision coordination embodiment, for example, the slave station may report its decision to the master station when its decision has been changed. In contrast, in some embodiments, the combined decision from the master station may be disseminated to the slave stations at a specific frequency. As a result, a newly joined station to the network may quickly know the most recent channel reuse decisions executed in the network. In some examples, the current combined decision of the master station can be periodically broadcasted as part of or with a management message. For example, in powerline systems, a beacon message may be used by the central controller (i.e., master station) to carry the combined decision.

Figure 8:
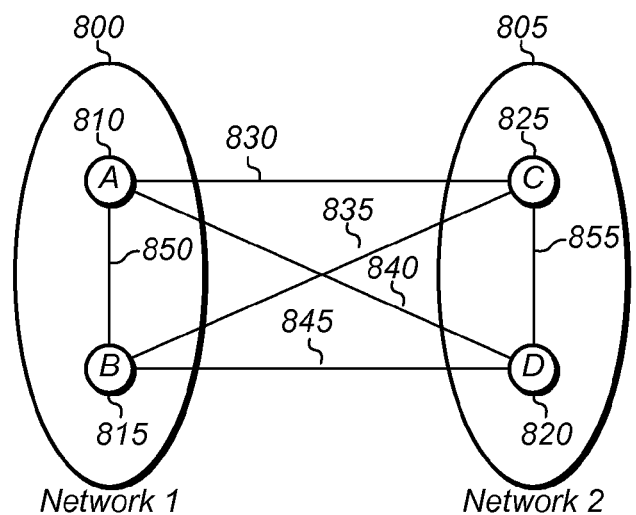

In addition to the decision coordination between the stations in the same network, decision coordination may similarly take place between neighbor networks. Turning now to FIG. 8, networks 800 and 805 are shown, with each network having two stations. For ease of understanding on the example shown in FIG. 8, signal strength attenuation 855 is 30 dB and signal strength attenuations 830, 835, 840, 845, and 850, corresponding to the other illustrated signal propagation paths, are each 60 dB. One example scenario where a network configured as shown in FIG. 8 may arise is in a home network that includes two local networks where two stations from one local network are located in the same room while the two stations from the other local network are located in different rooms, or far apart in a large open room. From network 800's perspective, sharing the channel with network 805 may lead to better network throughput than reusing the channel. This is because the SINRs at each of stations 810 and 815 could be 0 dB when stations in network 800 and network 805 access the channel simultaneously. As a result, the transmission data rate between station 810 and station 815 as well as the throughput of network 800 may be very low. In contrast, from network 805's perspective, because the SINRs at each of stations 825 and 820 may be at least 30 dB when networks 800 and 805 reuse the channel, such a high SINR may support a high transmission data rate between stations 825 and 820. Compared with sharing the channel with network 800, the decision of reusing the channel may let network 805 have a similar transmission data rate and a doubled bandwidth temporal share. Therefore, network 805 may decide to reuse the channel whereas network 800 may decide to share the channel with network 805.

When two neighbor networks operate with different channel reuse decisions, the behavior of the whole system may be similar to when the two networks reuse the channel. Even if network 800 wants to share the channel with network 805, it may not have many chances to detect preambles and delimiters from network 805. This is because network 805 decides to reuse the channel and its stations will ignore the detected preambles and delimiters from network 800 and continue their data transmissions. Thus, the time instances of starting channel contention in the two networks may be simultaneous. As a consequence, it can be observed that the throughput difference between the two networks may be quite large (with network 805 clobbering network 800).

To avoid this type of performance discrepancy due to inconsistent channel reuse decisions between a pair of neighbor networks, additional channel reuse coordination between neighbor networks may be performed. In some embodiments, a channel reuse decision of a network may be provided to neighbor networks. Then, the decisions of a pair of neighbor networks can be used to adjust the combined decision of each network. For example, referring again to FIG. 8, the decision of each of networks 800 and 805 may be exchanged with the other network. If the decision of network 800 indicates to share the channel with network 805 decision, network 805 may share the channel with network 800. In this way, if network 805 decided to reuse the channel from its own perspective, the decision may be modified when it receives network 800's decision to share. In some embodiments, the decision exchanges between neighbor networks may be realized by stations in one network overhearing the management messages containing the combined decision for a neighbor network. The combined decision for the neighbor network may then be extracted from the overheard management message. For example, in powerline systems, stations in one network may extract the decision of its neighbor networks by overhearing the beacon messages sent by the central controllers in a neighbor network. Alternatively, one or more dedicated management messages may be used to forward the decision from one network to its neighbor networks.

In some instances, some stations with the dynamic channel reuse feature, called enhanced stations, may coexist with devices, called legacy stations, that may not support this function. If a network includes at least one legacy station in a network, the need for compatibility may force the enhanced stations to disable the dynamic channel reuse function and operate in the same way as legacy stations. In some embodiments, a station's capability of supporting dynamic channel reuse may be detected by monitoring if the device has sent one or more management messages to report its decision or disseminated the combined decision in the network. In such instances, the existence of a single legacy station in a network may cause the network to share the channel with its neighbor networks and not dynamically reuse the channel.

In some embodiments, the network may be partitioned into two separate sub-networks. For example, network partitioning may be based on the real-time network traffic topology. The partition may allow the traffic associated with legacy stations to be isolated so that the traffic associated with enhanced stations may still perform the disclosed dynamic channel reuse. The network partition can be implemented in powerline systems by adaptively assigning a central controller and associating proper stations in each sub-network. As a result, the compatibility issue of enhanced stations and legacy stations in a single network is transformed into a compatibility issue of two separate networks where one sub-network includes enhanced stations and the other sub-network includes at least one legacy station.

Figure 10:
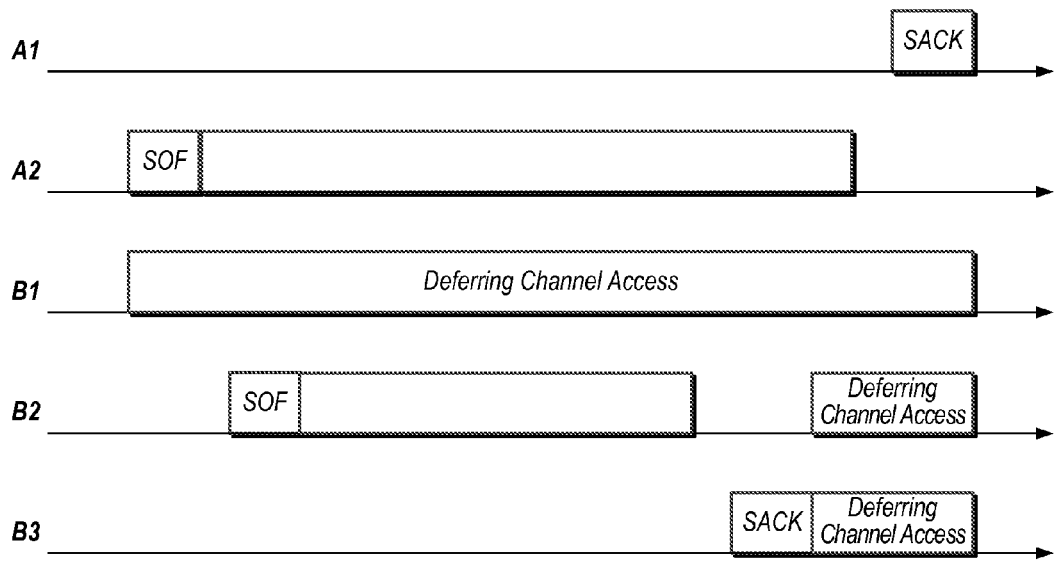
FIG. 10 is a diagram of an example dynamic channel reuse where legacy stations may be present, according to some embodiments.

In various embodiments in which a network includes a mixture of enhanced stations and legacy stations, each of the stations in the network may defer to neighbor network transmissions. In such scenarios, the enhanced stations may still be able to exchange PPDUs with other enhanced stations within the local network during intervals in which a neighboring network station is transmitting. One example of such a scenario is shown in FIG. 10. Stations A1 and A2 of FIG. 10 may be stations in the neighbor network. Stations B1, B2, and B3 may be stations in the local network. B1 may be a legacy station and B2 and B3 may be enhanced stations. In this example, station A1 may send a PPDU to A2, which may be followed by A2 sending an acknowledgement to A1. Because B1 is a legacy station, the combined network wide decision may be to share the channel with the neighbor network that includes A1 and A2. Therefore, B2 and B3 may not be able to fully ignore transmissions between A1 and A2 even when interference from A1 and/or A2 is low. To enable B2 and B3 to improve performance and still maintain synchronization with B1, as shown in FIG. 10, B2 and B3 may be able to exchange transmissions (e.g., short transmission) with each other (and/or other enhanced stations in the local network) during the deferring interval of B1. If the transmission between B2 and B3 ends before the deferring interval of B1, they could go back to deferring or send an additional transmissions. As shown, B2 and B3 go back to deferring channel access. In any event, B2 and B3 may come out of deferment at about the same time as B1.

Turning back to FIG. 8, consider a scenario where network 805 includes enhanced stations 825 and 820 and network 800 includes enhanced station 810 and legacy station 815. In one embodiment, network 805 may decide to reuse the channel with network 800 whereas network 800 may decide to share the channel with network 805. In such an embodiment, network 805 may infer that network 800 operates in legacy mode if stations in network 805 cannot overhear the management messages that include the reports of channel reuse decisions from network 800. As a result, network 805 may decide to share the channel with network 800. Accordingly, in such an embodiment, one legacy station in one network may cause neighbor networks to share the channel with the network.

In other embodiments, other share/reuse decisions may be made. Consider an example where two neighbor networks are symmetric regarding signal strength attenuations and noise level within each network, for example, if signal strength attenuation 850, between stations 810 and 815, of FIG. 8 is decreased from 60 dB to 30 dB. As a result, when network 805 decides to reuse the channel and executes the decision, even though network 800 continues sharing the channel with network 805, the two networks' data transmissions may overlap because stations in network 800 may rarely detect preambles and delimiters transmitted from network 805. Compared to a situation where legacy stations are upgraded to enhanced stations, a similar performance gain may be achieved.

If the two networks are asymmetric regarding the signal strength attenuations and noise level in each network (e.g., if the signal strength attenuation 850 between stations 810 and 815 of FIG. 8 is 40 dB). The stations in network 805 can apply transmission power control to alleviate the impact of the interference of network 805 to network 800. Specifically, when network 805 decides to reuse the channel with network 800, based on the received signal strength statistics at the intended receiver station, each transmitter station in network 805 may attempt to reduce its transmission power subject to the constraint that the resulting SINR at the receiver station is still high enough (e.g., above some threshold) to support a target transmission data rate. Therefore, when network 805 reuses the channel with network 800, the stations in network 800 may experience as little as possible interference from network 805.

In various embodiments, when a network with enhanced stations detects a neighborhood network with legacy stations, that network (and/or its individual stations) may use different rules for the channel reuse decision. Neighboring legacy stations may not be able to provide any indication whether the enhanced stations are causing excessive interference for transmission within their own network. As a result, one different rule may be that, for channel reuse with a legacy network (e.g., network having at least one legacy device), the interference from the legacy network should be significantly lower than when there is an enhanced neighbor network. For example, a threshold in the decision making may be more lower or higher, depending on the measure used in the threshold (e.g., threshold may be a higher SINR than in other embodiments). This rule may reduce the risk of the enhanced network clobbering the legacy network when it decides to reuse the channel.

When the received signal strength statistics information is measured on a per station basis (i.e., the received signal strength may be indexed by the station identity), the dynamic channel reuse algorithm may be extended to letting different stations intelligently decide whether to reuse the channel or not on a link by link basis. Thus, stations, may share the channel when reusing the channel will cause significant interference between them. With the finer granularity of channel reuse, the performance gain may be further improved. By defining a link by the traffic from a transmitter station to a receiver station, the channel reuse decision may be made between neighbor links. In a CSMA system, two neighbor links may reuse the channel if the resulting SINR at each end station of the links is sufficiently high. Similar to the case of channel reuse between neighboring networks, the decision coordination may be performed for each end station of a link as well as a pair of neighbor links. For coordination among end stations, either existing reserved fields in delimiters or a portion of a payload may be used to transport the decisions between the stations. Then, end stations' decisions may be consistent by letting each end station combine its own decision with the one from the other end station. For neighbor links' decision coordination, the end stations of each link may periodically disseminate the link's channel reuse decision to its neighbor links with management messages. For a pair of neighbor links, if one link decides to share the channel with the other link, both links may share the channel with each other.

Figure 9:
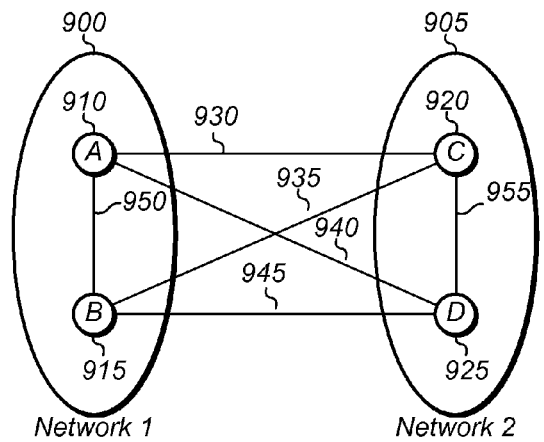

In a time division multiple access (TDMA) system, a station may be provided with a specific time allocation in which the station may transmit data to one or more stations. Accordingly, the techniques described herein may also be used to determine the set of stations that can reuse the channel in each time slot. Additional enhancements may also be made to further improve the performance gain of channel reuse in TDMA systems. In some examples, the constraint of channel reuse for stations in a TDMA system may be relaxed. For instance, two neighbor links may reuse the channel if the resulting SINR at each receiver station is sufficiently high. Referring to FIG. 9, in a TDMA implementation, stations 910 and 920 may transmit data to stations 915 and 925, respectively, during the same time slot. In contrast, in a CSMA system, it may be possible that station 915 is receiving while station 925 is transmitting. Assume for illustrative purposes that attenuations 945, 950, and 955 are each 30 dB, attenuations 935 and 940 are each 80 dB, and attenuation 930 is 100 dB. Such a scenario may cause a low SINR at station 915 because of the 30 dB attenuation from station 925 to station 915, as shown in the figure. As a result, in a CSMA system, station 915's data may be corrupted with a high probability. In some examples, other channel reuse situations may be available with transmission power control. Still referring to FIG. 9, without transmission power control, data transmission from station 910 to station 915 may not be scheduled in the same time slot as the data transmission from station 925 to station 920 due to strong interference from station 925 to station 915. If proper power transmission power control is applied, these data transmissions may occur in the same time slot. For instance, assuming noise level at each station is low, if station 925 reduces its transmission power by 35 dB, when stations 910 and 925 transmit data in the same time slot, the SINR at stations 915 and 920 may be 35 dB, which may be sufficiently high to support a high transmission data rate.

Figure 11:
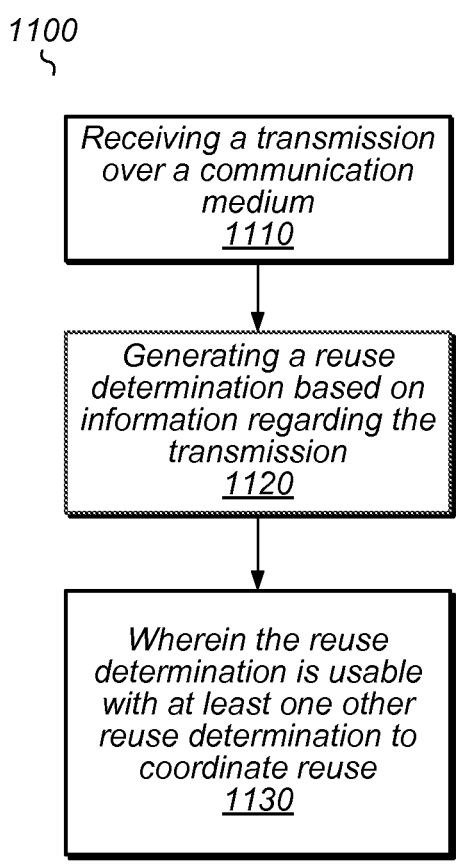
FIG. 11 illustrates a flowchart of one embodiment of the disclosed dynamic channel reuse techniques.

FIG. 11 illustrates a flowchart of one embodiment of dynamic channel reuse method 1100. While the blocks are shown in a particular order for ease of understanding, other orders may be used. In some embodiments, method 1100 may include additional (or fewer) blocks than shown.

As illustrated at 1110, a transmission may be received over a communication medium, or channel. For example a first station in a communication network may receive the transmission. The first station may be one of a plurality of stations in the communication network. In various embodiments, the communication network may also be referred to as a local network. The local network may be a powerline network, a coaxial network, or another type of network. The transmission may be received from another station of the plurality of stations (e.g., a second station) in the local network. In some instances, the local network may be a sub-network of a local network (e.g., the local network may be partitioned). The communication network may be a centralized network, a semi-distributed network, or a distributed network. Accordingly, the first station may be a coordinator station (e.g., in a centralized or semi-distributed network), or it may just be one of a plurality of stations of the network (e.g., in a semi-distributed or distributed network)

As shown at 1120, a reuse determination may be generated based on a variety of factors. For example, in some embodiments, the reuse determination may be based on information regarding the received transmission. One example of information regarding the transmission may include the signal strength of the received information. Another example may include statistical information included in the transmission such as received signal strength of signals received at the station sending the transmission to the first station. For example, the second station may send a dedicated message to the first station that indicates received signal strength(s) from one or more other stations, proximity to other stations, frequency of received transmission from other stations, etc. In some instances, a station may store information regarding each other station of the network. The reuse determination may indicate whether to reuse or share the communication medium.

At 1130, the reuse determination may be usable with at least one other reuse determination to coordinate reuse of the communication medium. The coordinated reuse may indicate whether to share or reuse the communication medium. The other reuse determination may be from a station from a different network (e.g., neighbor network) than the communication network or it may be from another station in the same communication network. Accordingly, the coordination may be a local network level coordination, a link to link coordination (e.g., a determination for two end stations that make up a link), a sub-network level coordination, or a coordination between two or more neighbor networks. In some instances, the coordination may include updating/synchronizing each of the reuse determination and the other reuse determination to the same determination, or it may include separately storing a combined determination that holds priority over the constituent determinations upon which the coordination is based.

In some instances, one or more of blocks 1110, 1120, and 1130 may be repeated, for example, for transmissions received from other stations in the same local network or from stations in a neighbor network (as described at FIG. 6).

In various embodiments, the first station may be a station in a distributed network. In a distributed network, each station in the local network may be configured to locally generate the reuse determination for the local network, which should be the same as each station. The reuse determination may be coordinated with another reuse determination, for example, from a neighbor network, to generate the coordinated reuse determination. In a distributed network, the coordination may be a determination between two or more neighbor networks.

In some embodiments, the first station may be a station in a semi-distributed network. The first station may be a coordinator station of the communication network. The coordinator station may also be referred to as a master station or a central coordinator. The first station may generate the reuse determination for the local network based on the received transmission from block 1110. The reuse determination may additionally be based on other received transmissions. As an example, a local network may include the coordinator station and four slave stations. The coordinator station may receive transmissions from each of the four slave stations and generate the reuse determination based on information regarding each of the four transmissions. The reuse determination may then be usable with a reuse determination from a neighbor network to coordinate reuse of the communication medium. The first station may be the station that generates the reuse determination or it may be a station from the neighbor network. In some embodiments, if either of the two networks makes a reuse determination to share the communication medium, the coordinated reuse determination may be to share the communication medium. In other embodiments, a more complex determination may be based on additional factors, such as weighting one reuse determination greater than the other. For instance, one network's reuse determination may be to share the channel but it may make that determination based on frequency and/or strength of interference from the other network. Thus, in one embodiment, frequency of the interference conditions (e.g., frequency of traffic/transmission frequency that interferes over a threshold) may also be used in coordinating reuse of the communication medium between two networks. Similar weighting of reuse determinations may also be used in coordinating station's decisions within a local network, such as in a semi-distributed network or for a sub-network or link specific determination.

In some embodiments, the first station may be a station in a semi-distributed network. The first station may be a coordinator station or a station that makes its own local determination and provide that determination to the coordinator station of the semi-distributed network. Thus, in an embodiment where the first station is a station other than the coordinator station, the reuse determination of block 1120 may be the determination from the perspective of the first station, which may then be usable at 1130 with other determinations from other stations to coordinate reuse of the communication medium, which in that instance, may be a coordination for the local network. In embodiments where the first station is the coordinator station, the reuse determination may be the determination for the local network. The first station may generate the reuse determination based on information regarding the received transmission from block 1110. The received transmission in such an embodiment may be a reuse determination from one of the other stations of the local network. The coordination may then be a coordination between the local network and a neighbor network. The first station may perform the reuse coordination or a station of the neighbor network, or both the first station and the station from the neighbor network may perform the coordination.

In various instances, the first station may provide the reuse determination to another station (e.g., to a station from a neighbor network, to a coordinator station of a local network, etc.). In some cases, the first station may receive the other reuse determination.

As described herein, in some instances, the network may be partitioned into first and second sub-networks. The first sub-network may include the first station and at least one other station and the second sub-network may include at least one legacy station. The first station and/or the other station may reuse the communication medium to transmit to each other (and other stations in the first sub-network). The partitioning of the networks may be performed by the first station, a different coordinator station, or by one or more of the enhanced stations of the local network that is being partitioned.

In one embodiment, transmissions between stations of the network may be performed according to a time division multiple access (TDMA) protocol. In such instances, the reuse determination may indicate which stations of the stations in the network may reuse the communication medium in the same time slot as stations of a neighbor network.

The techniques described herein may be implemented in a variety of manners. For example, as described herein, the techniques may be implemented as software that is executable by a processor as part of the MAC module at each station. The upgrade of the stations may be achieved by updating the software that supports the dynamic channel reuse function. Upgrade may refer to updating functionality of a station that is already an enhanced station or it may mean updating a legacy station to an enhanced station. Thus, in one embodiment, a station may be upgraded from a legacy station to an enhanced station by updating its MAC module software. In other instances, a legacy station may be replaced with an enhanced station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a first station in a local network, the method comprising:
   receiving a first transmission over a communication medium;
   generating a first reuse determination based, at least in part, on received signal strength information regarding the first transmission, the first reuse determination indicating whether to reuse the communication medium with other stations; and
   receiving at least one other reuse determination from a neighbor station in a neighbor network different than the local network, wherein the first reuse determination is coordinated with the at least one other reuse determination to coordinate reuse of the communication medium with the other stations.

2. The method of claim 1,
wherein the first transmission is received from a second station and includes statistical information on signals received by the second station from one or more other stations, and
wherein the first reuse determination is further based on the statistical information.

3. The method of claim 2, further comprising providing the first reuse determination from the first station to a coordinator station.

4. The method of claim 3, wherein the coordinator station is configured to use the first reuse determination and other reuse determinations corresponding to at least some other stations within the local network to make a network reuse determination, and wherein the coordinator station is further configured to provide the network reuse determination to the other stations within the local network.

5. The method of claim 1, further comprising:
receiving a second transmission;
determining whether the second transmission is from a local station in the local network or the neighbor station from the neighbor network, wherein said determining is based on a header of the second transmission; and
applying or bypassing the first reuse determination based on said determining.

6. The method of claim 1, further comprising:
receiving multiple transmissions, including the first transmission, over the communication medium, wherein each of the multiple transmissions includes statistical information on signals received from one or more other stations,
wherein the first reuse determination is further based on the statistical information included in the multiple transmissions.

7. The method of claim 6, wherein the first station is a coordinator station, the method further comprising providing the first reuse determination from the first station to the one or more other stations of the local network.

8. The method of claim 1, wherein the first reuse determination is further based on received signal strength information regarding a second transmission received by the first station.

9. The method of claim 1, further comprising sending the first reuse determination from the first station to the neighbor station.

10. The method of claim 8, wherein the second transmission is received by the first station from a second station, the second transmission comprising statistical information regarding signal strengths of other signals received at the second station.

11. The method of claim 1, further comprising:
updating the first reuse determination to indicate to share the communication medium rather than reuse the communication medium when either of the first reuse determination or the at least one other reuse determination indicates to share the communication medium.

12. The method of claim 1, wherein the first reuse determination is coordinated with a second reuse determination from a second station of the local network, the second station being different from the first station.

13. The method of claim 1, wherein the local network includes a central coordinator configured to perform reuse coordination based on reuse determinations from a plurality of stations.

14. The method of claim 13, further comprising sending the first reuse determination from the first station to the central coordinator.

15. The method of claim 1, wherein the first reuse determination is a local network level determination.

16. The method of claim 1, wherein the first transmission is received from a second station via a link between the first station and the second station, and wherein the first reuse determination is coordinated for the link between the first station and the second station.

17. The method of claim 1, further comprising:
detecting a legacy station in the local network; and
adjusting a threshold associated with the first reuse determination responsive to detecting the legacy station in the local network.

18. The method of claim 17, further comprising:
partitioning the local network into a first sub-network that includes the first station and at least one other station, and a second sub-network that includes the legacy station,
wherein the first reuse determination comprises reusing the communication medium for stations in the first sub-network, and
wherein the first reuse determination comprises sharing the communication medium for stations in the second sub-network.

19. The method of claim 1, wherein the first reuse determination is further based on a transmission frequency of a second station from which the first transmission was received.

20. The method of claim 1, wherein the first reuse determination further indicates which stations of a plurality of stations in the local network may reuse the communication medium in a same time slot as stations of a plurality of others stations on the neighbor network, wherein transmissions in the local network are performed according to a time division multiple access (TDMA) protocol.

21. The method of claim 1, wherein the local network is a powerline network.

22. A non-transitory computer-readable storage medium storing program instructions, wherein the program instructions are computer-executable to cause a first station in a local network to perform operations comprising:
receiving a first transmission over a communication medium;
generating a first reuse determination based, at least in part, on received signal strength information regarding the first transmission, the first reuse determination indicating whether to reuse the communication medium with other stations; and
receiving at least one other reuse determination from a neighbor station in a neighbor network different than the local network, wherein the first reuse determination is coordinated with the at least one other reuse determination to coordinate reuse of the communication medium with the other stations.

23. A system, comprising:
a first station in a local network configured to:
receive a first transmission over a communication medium;
generate a first reuse determination based, at least in part, on received signal strength information regarding the first transmission, the first reuse determination indicating whether to reuse the communication medium with other stations; and
receive at least one other reuse determination from a neighbor station in a neighbor network different than the local network, wherein the first reuse determination is coordinated with the at least one other reuse determination to coordinate reuse of the communication medium with the other stations.

24. The method of claim 1, wherein the first reuse determination indicates either to reuse the communication medium using concurrent transmissions or to share the communication medium using contention based access.

* * * * *